(12) United States Patent
Kelso et al.

(10) Patent No.: US 10,613,551 B2
(45) Date of Patent: Apr. 7, 2020

(54) USE OF MULTI-SCALE FIDUCIALS BY AUTONOMOUSLY CONTROLLED AERIAL VEHICLES

(71) Applicant: Amazon Technologies, Inc., Seattle, WA (US)

(72) Inventors: Carl Ryan Kelso, Seattle, WA (US); Yves Christian Albers Schoenberg, Cambridge (GB); James Yang, Philadelphia, PA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 158 days.

(21) Appl. No.: 15/701,238

(22) Filed: Sep. 11, 2017

(65) Prior Publication Data

US 2017/0371351 A1    Dec. 28, 2017

Related U.S. Application Data

(63) Continuation of application No. 14/527,261, filed on Oct. 29, 2014, now Pat. No. 9,791,865.

(51) Int. Cl.
*B64C 39/02* (2006.01)
*G05D 1/08* (2006.01)
(Continued)

(52) U.S. Cl.
CPC ......... *G05D 1/0808* (2013.01); *B64C 39/024* (2013.01); *G05D 1/101* (2013.01);
(Continued)

(58) Field of Classification Search
CPC ........ G05D 1/808; G05D 1/101; G05D 1/102; B64C 39/024; B64C 2201/141
See application file for complete search history.

(56) References Cited

U.S. PATENT DOCUMENTS 5,260,556 A    11/1993    Lake et al.
5,691,527 A    11/1997    Hara et al.
(Continued)

FOREIGN PATENT DOCUMENTS

CN    101354705 A    1/2009
EP    3213262 A1    9/2017
(Continued)

OTHER PUBLICATIONS

Canadian Patent Application 2,961,912 filed on May 11, 2017, Office Action dated Jan. 29, 2019.
(Continued)

*Primary Examiner* — Dale Moyer (74) *Attorney, Agent, or Firm* — Thomas | Horstemeyer, LLP (57) ABSTRACT

Disclosed are various embodiments involving use of a multi-scale fiducial by an autonomously controlled aerial vehicle. A first image at a first location is captured, and a first fiducial at a first scale of a multi-scale fiducial is recognized within the first image. The autonomously controlled aerial vehicle is piloted relative to the multi-scale fiducial based at least in part on information contained within the first fiducial. A second image at a second location is captured, and a second fiducial at a second scale of the multi-scale fiducial is recognized within the second image. An action is then performed based at least in part on information contained within the second fiducial.

20 Claims, 12 Drawing Sheets

(51) Int. Cl.
  *G06K 19/06* (2006.01)
  *G06K 7/14* (2006.01)
  *G05D 1/10* (2006.01)

(52) U.S. Cl.
  CPC .......... *G05D 1/102* (2013.01); *G06K 7/1426* (2013.01); *G06K 19/06037* (2013.01); *G06K 19/06056* (2013.01); *G06K 19/06131* (2013.01); *G06K 19/06168* (2013.01); *B64C 2201/141* (2013.01); *G06K 19/06009* (2013.01); *G06K 2019/06243* (2013.01); *G06K 2019/06262* (2013.01); *G06T 2207/30208* (2013.01)

(56) References Cited

U.S. PATENT DOCUMENTS

| | | | |
|---|---|---|---|
| 6,362,875 | B1 | 3/2002 | Burkley |
| 6,556,722 | B1 | 4/2003 | Russell et al. |
| 9,769,387 | B1* | 9/2017 | Beard ................ G06K 9/0063 |
| 9,791,865 | B2 | 10/2017 | Kelso et al. |
| 9,969,486 | B1* | 5/2018 | O'Brien ................ B64C 39/024 |
| 2004/0028258 | A1 | 2/2004 | Naimark et al. |
| 2004/0056097 | A1 | 3/2004 | Walmsley et al. |
| 2006/0007452 | A1 | 1/2006 | Gaspard et al. |
| 2006/0278722 | A1 | 12/2006 | Tominaga |
| 2007/0143737 | A1 | 6/2007 | Huang et al. |
| 2009/0090786 | A1 | 4/2009 | Hovis |
| 2010/0092079 | A1 | 4/2010 | Aller |
| 2011/0049250 | A1 | 3/2011 | Hovis et al. |
| 2012/0078451 | A1* | 3/2012 | Ohtomo ................ B64C 39/024 701/15 |
| 2012/0256000 | A1 | 10/2012 | Cok |
| 2012/0256007 | A1 | 10/2012 | Cok |
| 2013/0016876 | A1 | 1/2013 | Wooley et al. |
| 2013/0094013 | A1 | 4/2013 | Hovis et al. |
| 2014/0100693 | A1 | 4/2014 | Fong et al. |
| 2015/0339508 | A1 | 11/2015 | Hosokane |
| 2016/0039542 | A1* | 2/2016 | Wang ................ B64F 1/20 701/2 |
| 2016/0068264 | A1* | 3/2016 | Ganesh ................ G08G 5/0069 701/2 |
| 2016/0122038 | A1* | 5/2016 | Fleischman ................ G06T 7/73 701/2 |
| 2017/0011333 | A1* | 1/2017 | Greiner ................ G06Q 10/083 |
| 2017/0031369 | A1* | 2/2017 | Liu ................ G05D 1/102 |
| 2018/0155011 | A1* | 6/2018 | Greiner ................ B64D 1/22 |
| 2019/0051194 | A1* | 2/2019 | Campos Macias .... G08G 5/045 |

FOREIGN PATENT DOCUMENTS

| | | |
|---|---|---|
| JP | 2000235617 A | 8/2000 |
| JP | 2002340756 A | 11/2002 |
| JP | 2003526842 A | 9/2003 |
| JP | 2011019707 A | 2/2011 |
| JP | 2013250684 A | 12/2013 |
| WO | 2016069587 A1 | 5/2016 |

OTHER PUBLICATIONS

Canadian Office Action dated Jan. 31, 2016 for application No. 2,961,912.

Fuller et al., "Introduction to ASML PAS 5500 Wafer Alignment and Exposure", pp. 28-31, https://people.rit.edu/lffeee/ALIGN-ASML.pdf, Oct. 11, 2011.

Japanese Office Action dated Mar. 27, 2018 for application No. 2017-521194.

Lange, Sven, Niko Sunderhauf, and Peter Protzel,. "A vision based onboard approach for landing and position control of an autonomous multirotor UAV in GPS-denied environments." Advanced Robotics, 2009. ICAR 2009. International Conference on. IEEE, 2009.

ISO/IEC 18004:2006. Information technology—Automatic identification and data capture techniques—QR Code 2005 bar code symbology specification. International Organization for Standardization, Geneva, Switzerland.

ISO/IEC 18004:2015. Information technology—Automatic identification and data capture techniques—QR Code bar code symbology specification. International Organization for Standardization, Geneva, Switzerland. http://www.iso.org/iso/catalogue_detail.htm?csnumber=62021.

Japanese Patent Application JP2017-521194 filed on Oct. 27, 2015, Notice of Rejection dated Jul. 17, 2018.

European Office Action for application No. 15 794 700.3-1201 dated Apr. 6, 2018.

CN Office Action for 201580059113.1 dated Jun. 5, 2019.

European Patent Application 15 794 700.3 filed on Oct. 27, 2015, Office Action dated Mar. 11, 2019.

* cited by examiner

USE OF MULTI-SCALE FIDUCIALS BY AUTONOMOUSLY CONTROLLED AERIAL VEHICLES

CROSS-REFERENCE TO RELATED APPLICATIONS

This application is a continuation of, and claims priority to, co-pending U.S. Patent Application entitled "MULTI-SCALE FIDUCIALS," filed on Oct. 29, 2014, and assigned application Ser. No. 14/527,261, which is incorporated herein by reference in its entirety.

BACKGROUND

Fiducials are optically recognizable features often used in computer vision applications. Common fiducials include grids of black and white blocks of a fixed size, which may be randomly generated. Applications for fiducials may include localization, tracking, and detecting the orientation of objects marked with these features, including robotics, printed circuit board manufacturing, printing, augmented reality, and automated quality assurance.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIGS. 3A-6 present several additional examples of multi-scale fiducials according to various embodiments of the present disclosure.

DETAILED DESCRIPTION

The present application relates to multi-scale fiducials that may facilitate target identification and tracking at varying distances. Changes in the distance between the imaging device and the fiducial may result in changes in the size of the appearance of the fiducial in the captured image. For example, at a first distance from the fiducial, a block feature of the fiducial may be five pixels square in the captured image. At a second, closer distance from the fiducial, the same block feature may be twenty pixels square in the captured image. Consequently, with varying distances, fiducial recognition algorithms may need to compensate for the change in scale of the fiducial.

One approach to compensating for the change in scale may be to use a scale-invariant algorithm, i.e., an algorithm that can operate regardless of the current size of the fiducial. In some cases, however, a scale-invariant algorithm cannot be used due to limitations in equipment processing power or ability to modify the fiducial recognition logic.

Various embodiments of the present disclosure employ fiducials of varying scales in order to take advantage of the change in size of the fiducial at different distances. Fiducial markers with such properties may be used for landing and tracking optical targets across broad distances. As a non-limiting example, such fiducials may be used for guiding autonomously controlled aerial vehicles or in other vehicles capable of movement. It is understood, however, that such fiducials may be useful in any computer vision application involving fiducials. The fiducials discussed herein may be printed on labels and affixed to objects, painted directly on objects, incorporated directly in construction of objects, and so on. The fiducials may be present on fixed objects or mobile objects. In one scenario, the fiducials described herein may be present on another autonomously controlled aerial vehicle.

Figure 1:
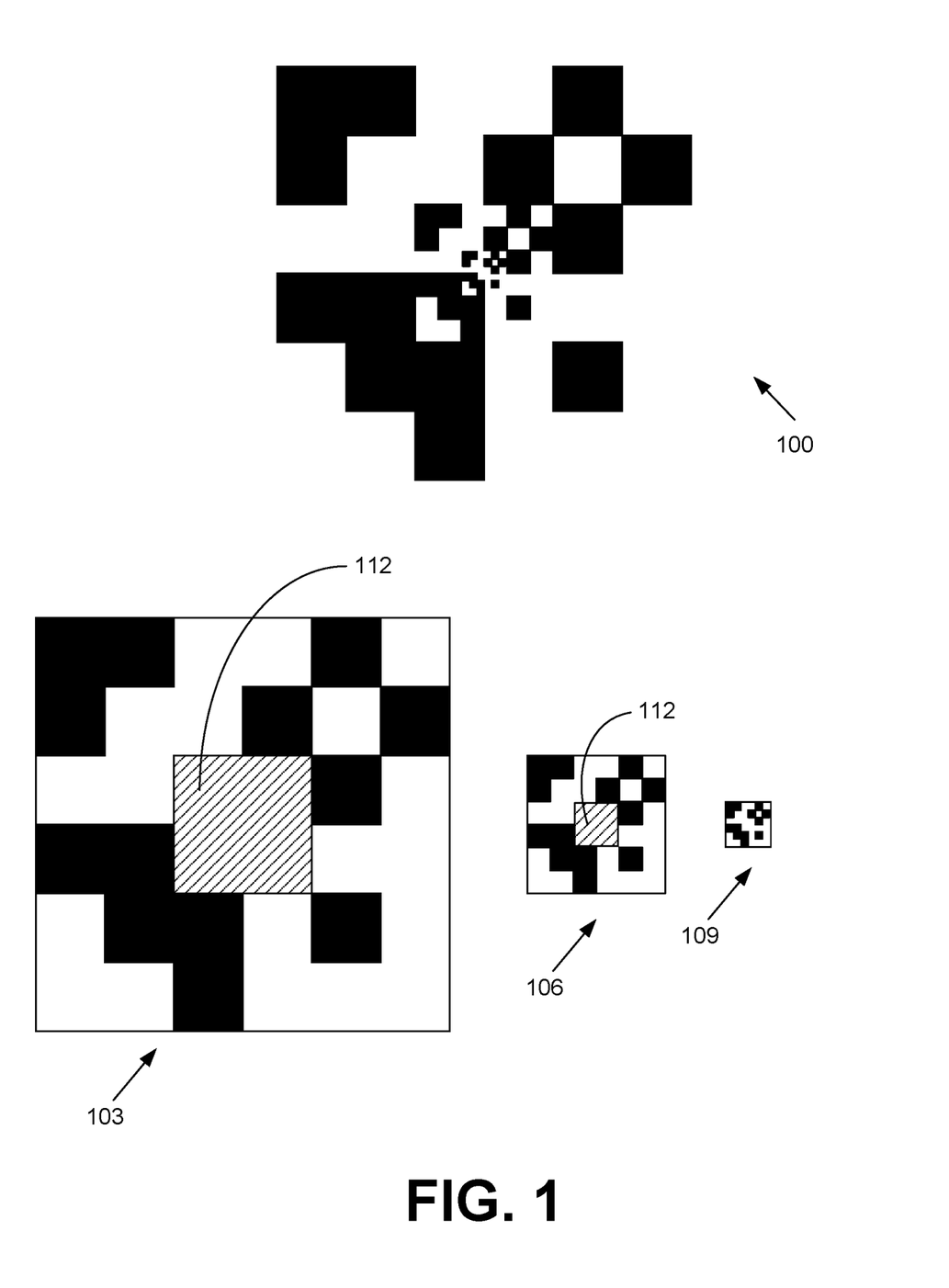
FIG. 1 illustrates one example of a multi-scale fiducial according to various embodiments of the present disclosure, with a breakdown of the components of the multi-scale fiducial being graphically illustrated.

With reference to FIG. 1, shown is one example of a multi-scale fiducial 100 with a breakdown of the components of the multi-scale fiducial 100 being graphically illustrated. In this example, the multi-scale fiducial 100 consists of three component fiducials: a parent (i.e., a first) fiducial 103, a child (i.e., a second) fiducial 106, and a grandchild (i.e., a third) fiducial 109. Although a nesting of three is employed in this non-limiting example, it is understood that multi-scale fiducials may be nested to an arbitrary depth (or not nested at all) depending upon the specific configuration and purpose of the fiducial.

Each of the component fiducials 103, 106, and 109 in this example comprises a six-by-six grid of black or white square tiles. In fact, in this instance, each of the component fiducials 103, 106, and 109 are versions of the same grid at three different scales. In addition to merely facilitating identification of an object, the component fiducials 103, 106, and 109 may encode specific information. For example, each tile may be viewed as encoding a bit of information depending on whether the tile is white or black. Each scale of the multi-scale fiducial 100 may be used independently to determine a relative position of its respective parent fiducial and/or its respective child fiducial.

With a multi-scale fiducial 100, a portion 112 of the component fiducial 103, 106 may be reserved for the corresponding nested fiducial. A scale-variant algorithm for recognizing the component fiducials 103, 106 may be configured to actively ignore data corresponding to the corresponding reserved portion 112 that is an expected location of a child fiducial. Although in this example the reserved portion 112 is shown as being in the center of the component fiducials 103, 106, it is not required that the reserved portion 112 be in the center or even in the same relative position. In fact, the reserved portion 112 may also exist outside the boundaries of the fiducial 103, 106 in a location relative to the fiducial 103, 106. The reserved portions 112 may be at a location known to the fiducial recognition algorithm. Otherwise, for example, the reserved portion 112 of the parent fiducial 103 may appear as noise to the fiducial recognition algorithm.

In the following discussion, a general description of an example of a fiducial recognition system and its components is provided, followed by a discussion of the operation of the same.

Figure 2:
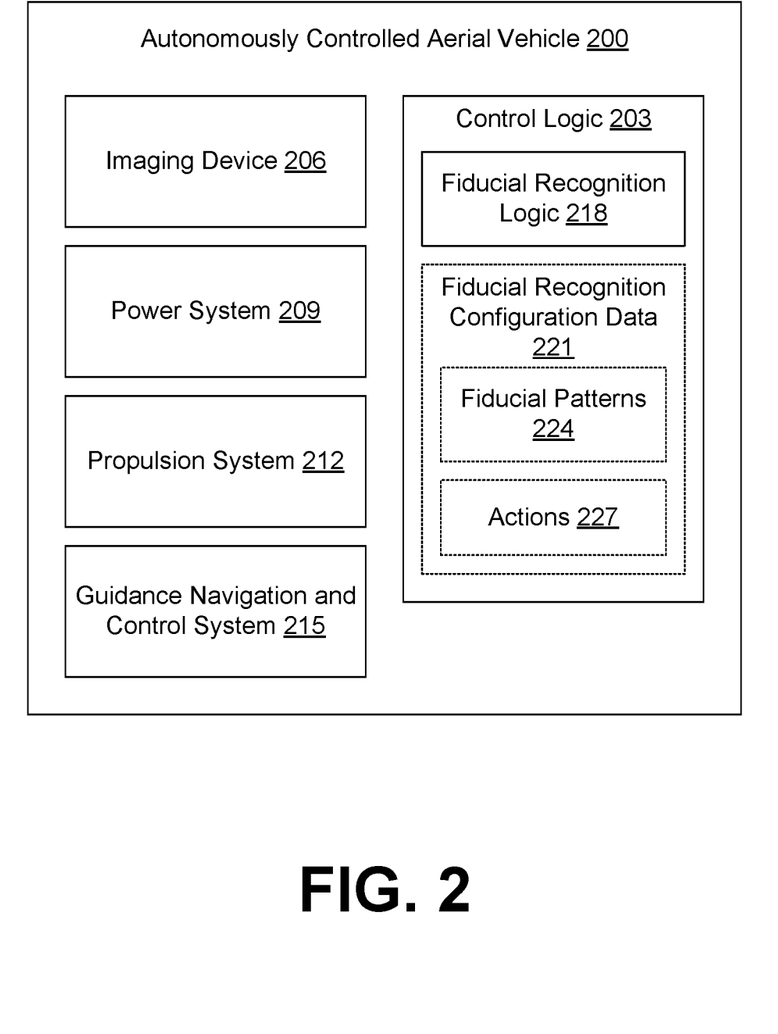
FIG. 2 is a block diagram of an autonomously controlled aerial vehicle according to various embodiments of the present disclosure.

Turning now to FIG. 2, shown is a block diagram of an autonomously controlled aerial vehicle 200 according to various embodiments. The autonomously controlled aerial vehicle 200 may include control logic 203, an imaging device 206, a power system 209, a propulsion system 212, a guidance navigation and control system 215, and/or other components. The autonomously controlled aerial vehicle 200 may, for example, correspond to a multi-rotor drone or other aircraft.

The imaging device 206 may include an image sensor configured to capture digital images of the surroundings of the autonomously controlled aerial vehicle 200 at one or more resolutions. In one embodiment, the imaging device 206 may capture color images. However, color images may have less sensitivity due to the presence of a color filter. Thus, in another embodiment, the imaging device 206 may be configured to capture grayscale images. In some embodiments, the autonomously controlled aerial vehicle 200 may employ a plurality of imaging devices 206, e.g., to observe different directions, provide stereo data, provide geometric data, etc. The imaging device 206 may capture non-visible electromagnetic radiation, such as infrared, ultraviolet, etc.

The power system 209 may include a battery or other source of power. The battery may be rechargeable, and one use case of the present disclosure may be to direct the autonomously controlled aerial vehicle 200 to dock at a charging station. The propulsion system 212 may control the propulsion or thrust of the autonomously controlled aerial vehicle 200. For example, the propulsion system 212 may control the operation of a plurality of propellers that provide vertical lift and horizontal propulsion. The guidance navigation and control system 215 may control the orientation of the autonomously controlled aerial vehicle 200, e.g., rotation of the autonomously controlled aerial vehicle 200.

The control logic 203 is configured to control the operation of the autonomously controlled aerial vehicle 200. To this end, the control logic 203 may control the operation of the imaging device 206, the power system 209, the propulsion system 212, the guidance navigation and control system 215, among other systems of the autonomously controlled aerial vehicle 200. The control logic 203 may incorporate fiducial recognition logic 218 that operates upon fiducial recognition configuration data 221. The fiducial recognition configuration data 221 may include fiducial patterns 224 and actions 227 to be performed upon recognizing the fiducial patterns 224.

The fiducial recognition logic 218 is configured to operate upon images captured via the imaging device 206 and to determine whether a fiducial pattern 224 is present in the images. The fiducial recognition logic 218 may employ scale-variant algorithms for recognizing fiducial patterns 224. As a non-limiting example, the fiducial recognition logic 218 may recognize a certain fiducial pattern 224 when the feature size is twenty pixels but not when the feature size is ten pixels, or vice versa. In some embodiments, scale-invariant algorithms may be employed by the fiducial recognition logic 218 while recognizing multi-scale fiducials to allow fiducials of multiple scales to be leveraged concurrently.

If a fiducial pattern 224 is present, the control logic 203 may be configured to perform a certain action 227. The action 227 may include piloting the autonomously controlled aerial vehicle 200 in a certain direction relative to the detected fiducial pattern 224, rotating or otherwise adjusting the orientation of the autonomously controlled aerial vehicle 200, and/or other actions. As the autonomously controlled aerial vehicle 200 is piloted toward the detected fiducial pattern 224, other nested fiducial patterns 224 may become visible (i.e., recognizable) in images captured via the imaging device 206. Similarly, the previously detected fiducial patterns 224 may become at least partially clipped or out of view of the imaging device 206.

In one non-limiting example, a parent fiducial may be visible on a wall of a building. Blocks of the parent fiducial may correspond to painted concrete blocks. The parent fiducial may assist the autonomously controlled aerial vehicle 200 determine which wall to pilot toward. Within the parent fiducial may be one or more child fiducials that help the autonomously controlled aerial vehicle 200 in identifying an orientation to be used in order to access one of potentially multiple power ports on the wall. The child fiducials may initially be unresolvable from an image through which the parent fiducial is recognized, i.e., the autonomously controlled aerial vehicle 200 may initially be too far away to resolve the child fiducials. Further nested fiducials may provide additional information such as voltages available and so on. The information may be provided in increasing detail as the power port becomes closer.

In another non-limiting example, a multi-scale fiducial may be present upon a moving object (e.g., an autonomously controlled aerial vehicle 200, a kite, a balloon, etc.) and recognized by a fixed system or another autonomously controlled aerial vehicle 200. Thus, a change in distance of a fiducial between captured images may be caused by movement of the fiducial itself as well as movement by the observer system.

Additional non-limiting examples of multi-scale fiducials that may be recognized by the fiducial recognition logic 218 will now be discussed. Features of the multi-scale fiducials may be selected to include high contrast or crisp corners or edges. High contrast features are unusual in nature and provide ease of recognition across a wide variety of conditions.

Figure 3A:
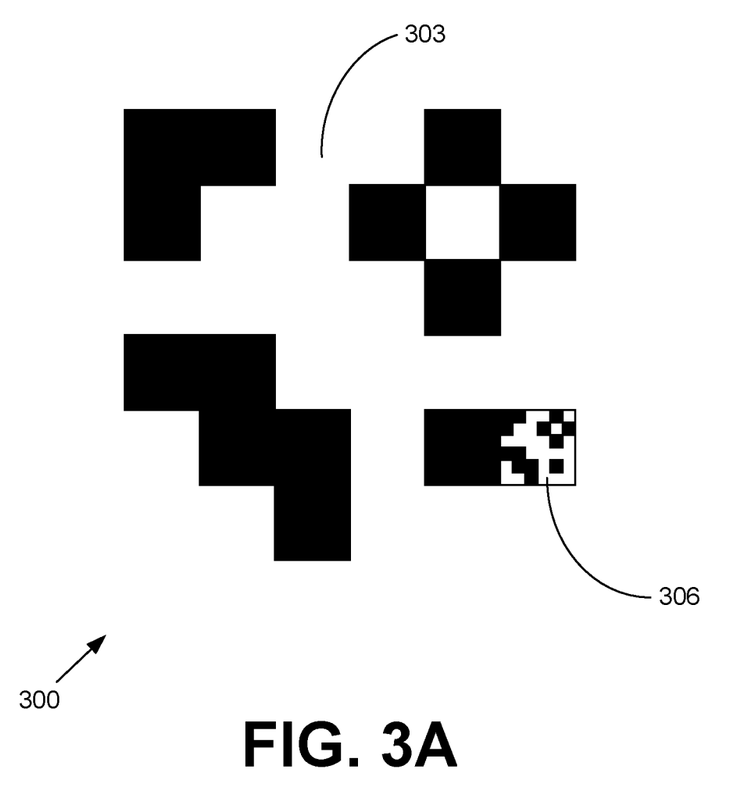

FIG. 3A depicts a multi-scale fiducial 300 with a parent fiducial 303 and a child fiducial 306. The design of the parent fiducial 303 is a six-by-six grid of black or white tiles similar to the parent fiducial 103 (FIG. 1). However, unlike the multi-scale fiducial 100 (FIG. 1), the child fiducial 306 is located off-center.

Figure 3B:
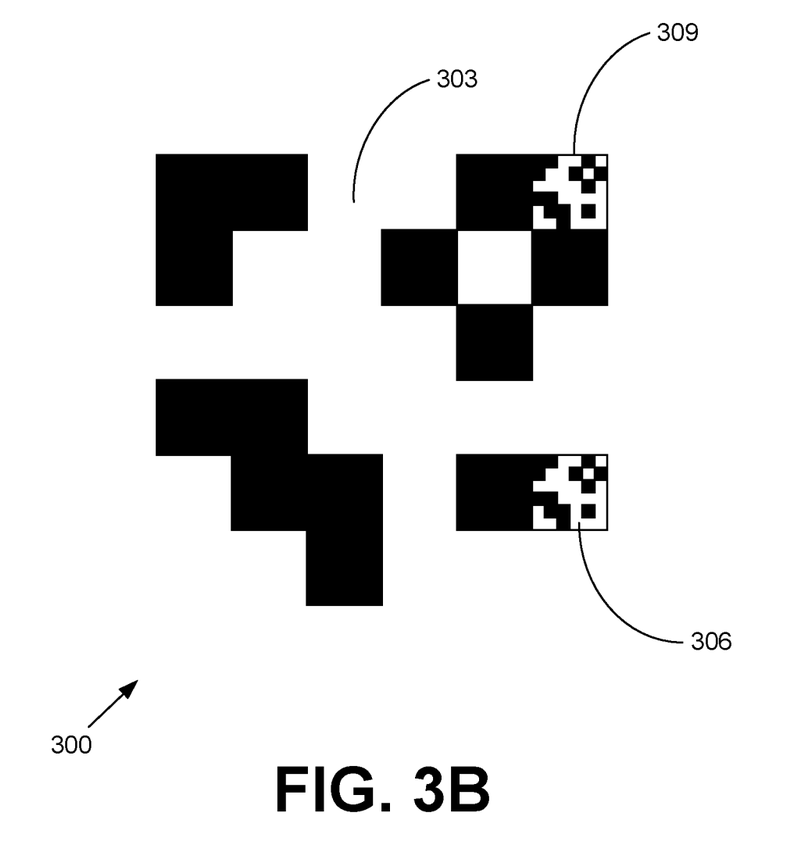

FIG. 3B is similar to FIG. 3A but includes multiple child fiducials 306, 309 at the same scale. Both child fiducials 306, 309 encode the same information.

Figure 3C:
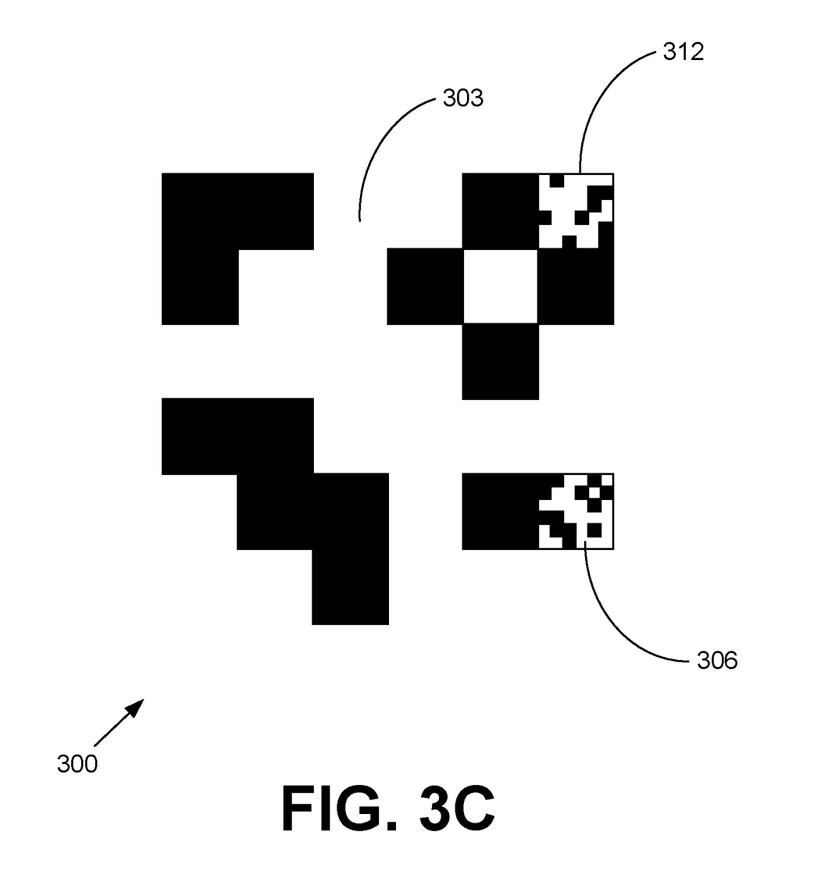

FIG. 3C is similar to FIG. 3B in that the multi-scale fiducial 300 includes multiple child fiducials 306, 312 at the same scale. However, the child fiducial 312 encodes information different from that of the child fiducial 306, and the child fiducial 312 exhibits a different design.

Figure 4A:
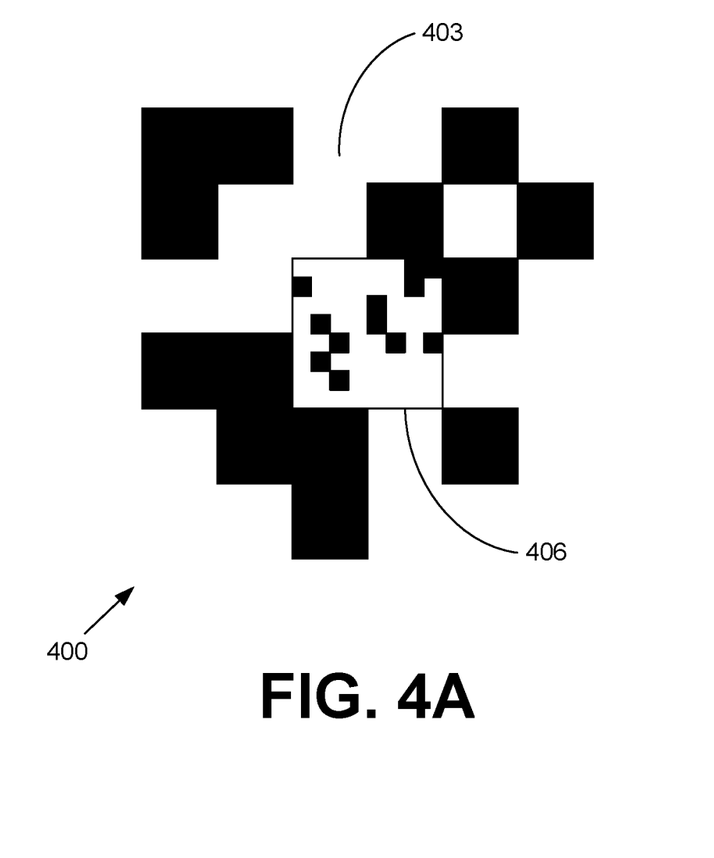

FIG. 4A depicts a multi-scale fiducial 400 with a parent fiducial 403 and a child fiducial 406. The design of the parent fiducial 403 is a six-by-six grid of black or white tiles similar to the parent fiducial 103 (FIG. 1). However, unlike the multi-scale fiducial 100 (FIG. 1) and the multi-scale fiducial 300 (FIG. 3A), the child fiducial 406 is a different design and may encode different information. Specifically, the child fiducial 406 is an eight-by-eight grid of black or white tiles. The child fiducial 406 may encode information as to how deep it is relative to the parent fiducial 403, which can be helpful for multi-scale fiducials 400 having many nestings. This provides localization feedback which may allow an optical system a ground truth measure of the object being viewed.

In some cases, a multi-scale fiducial 400 may include several child fiducials at the same nesting depth, which may be repeats of one another. This may assist in redundantly encoding information to overcome challenges posed by occluding features, such as shadows, etc.

Figure 4B:
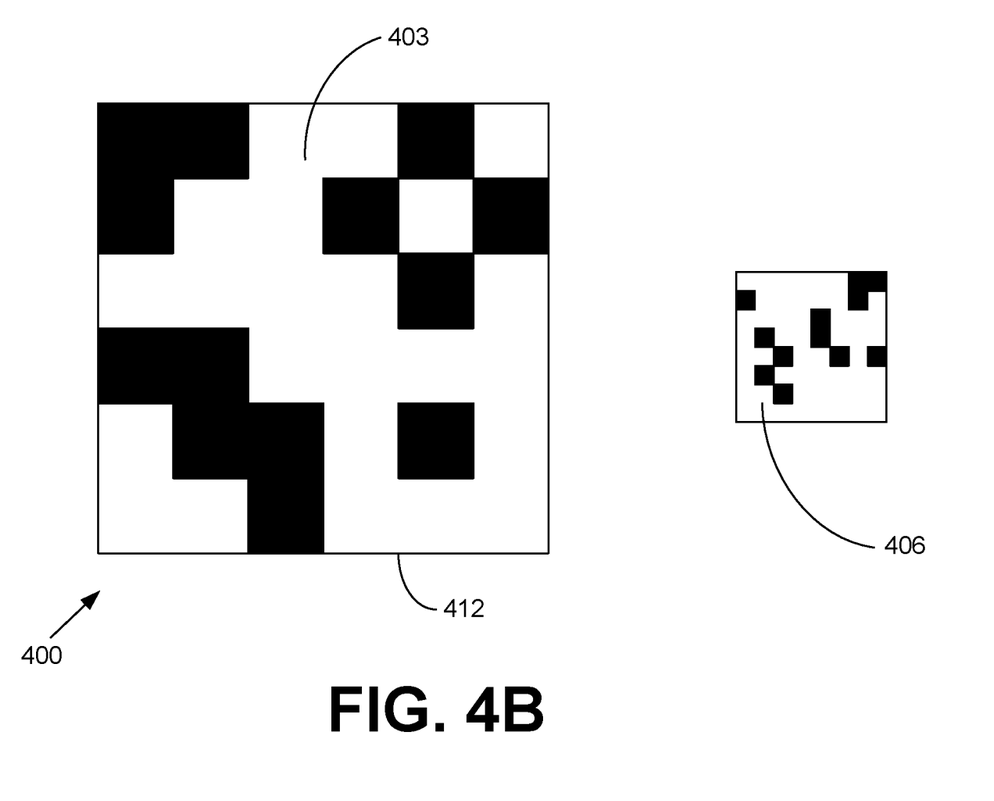

FIG. 4B depicts a multi-scale fiducial 400, where the child fiducial 406 is not nested within the boundary 412 of the parent fiducial 403. Instead, the child fiducial 406 may be located a position relative to the parent fiducial 403. Such a position may be predetermined and used to infer that the child fiducial 406 is linked to the parent fiducial 403. For example, upon recognizing the parent fiducial 403, the autonomously controlled aerial vehicle 200 (FIG. 2) may move to the right in order to recognize an expected child fiducial 406. Thus, a multi-scale fiducial 400 may include child fiducials 406 that are linked either by nesting in a parent fiducial 403 or by being at a predefined relative position to the parent fiducial 403.

Figure 5:
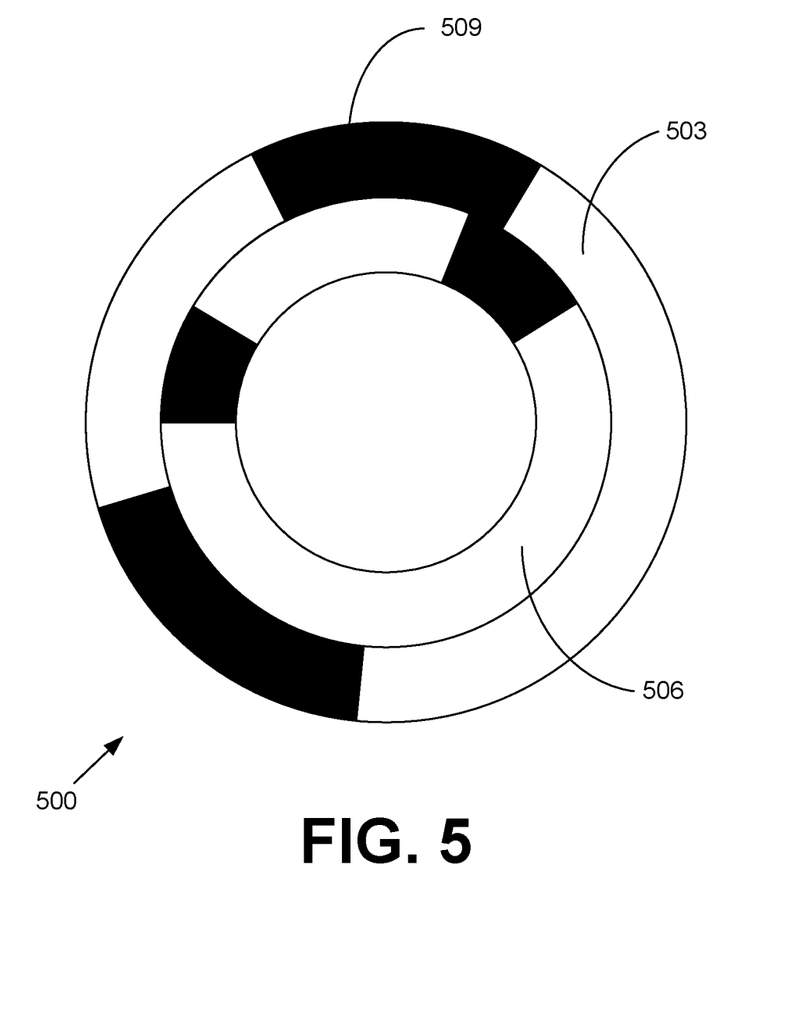

FIG. 5 depicts a multi-scale fiducial 500 with a parent fiducial 503 and a child fiducial 506. Unlike the multi-scale fiducial 100 (FIG. 1), the multi-scale fiducial 300 (FIG. 3A), and the multi-scale fiducial 400 (FIG. 4A), the multi-scale fiducial 500 employs nested rings rather than a grid of black or white squares. In this case, the multi-scale fiducial 500 includes a parent fiducial 503 and a child fiducial 506, but any level of nesting may be employed. Here, the parent fiducial 503 and the child fiducial 506 are concentric rings, but in other examples, the parent fiducial 503 and the child fiducial 506 may be off-center.

Each of the component fiducials 503 and 506 may include respective rotational markers 509. In this case, the rotational markers 509 are black or white, but color may also be used. The rotational markers 509 may be used to encode specific information. For example, the angular length and/or radial thickness of each rotational marker 509 may be compared against the circumference of the corresponding component fiducial 503, 506 to extract range information. Also, the angle between multiple rotational markers 509 may be used to encode information. In one example, a rotational marker 509 may comprise a bar code with a sync field and other information. The information encoded by the parent fiducial 503 may differ from the information encoded by the child fiducial 506. The rotational markers 509 of the component fiducials 503, 506 may encode the same angular information regardless of distance from the center. The child fiducial 506 may be freely rotated to encode rotational information due to the inherent symmetry of the border between the parent fiducial 503 and the child fiducial 506. Other geometries naturally have different symmetries that can be leveraged to this extent, as in FIG. 6.

Figure 6:
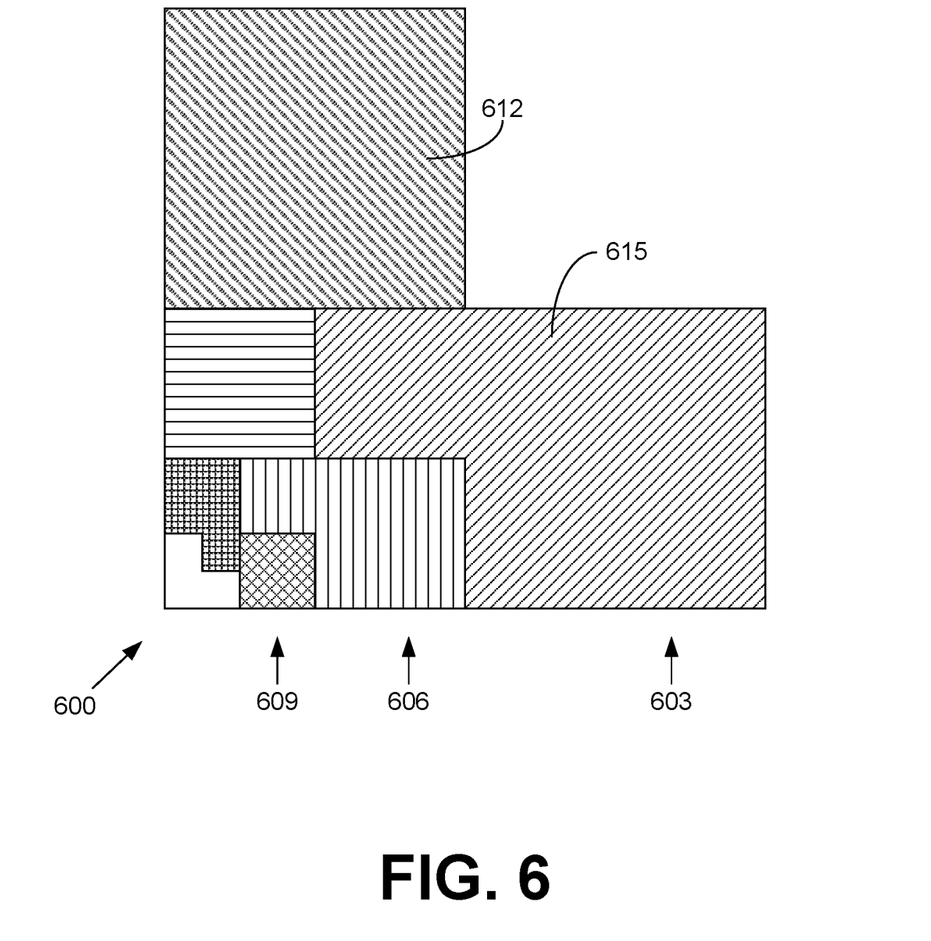

FIG. 6 depicts a multi-scale fiducial 600 with a parent fiducial 603, a child fiducial 606, and a grandchild fiducial 609. The multi-scale fiducial 600 of this example has a consistent L-like shape among its component fiducials 603, 606, 609. In this example, the multi-scale fiducial 600 may use color, texture, reflectance, or pattern to convey information. For example, each component fiducial 603, 606, 609 in this example has two portions, a top portion 612 and a side portion 615. The distinct colors, textures, reflectances, or patterns of the respective top portion 612 and side portion 615 may convey specific information. For simplicity of illustration, patterns are used in FIG. 6, but it is understood that colors may be employed.

For ease of recognition, the colors and patterns of the corresponding top portion 612 and the corresponding side portion 615 of the same scale may be similar or related (e.g., the top portion 612 has a pattern of horizontal lines, and the side portion 615 has a pattern of has vertical lines, or the top portion 612 is a dark shade of blue, and the side portion 615 has a medium shade of blue). As a non-limiting example, suppose that three different colors are employed. For a component fiducial with two portions, this yields nine different combinations, which can each correspond to a specific signal to the fiducial recognition logic 218 (FIG. 2). Also, the connectivity of the top portions 612 and the side portions 615 may convey specific information. For example, the top portion 612 and the side portion 615 exchange positions in the grandchild fiducial 609 (i.e., connected up instead of to the side).

Figure 7:
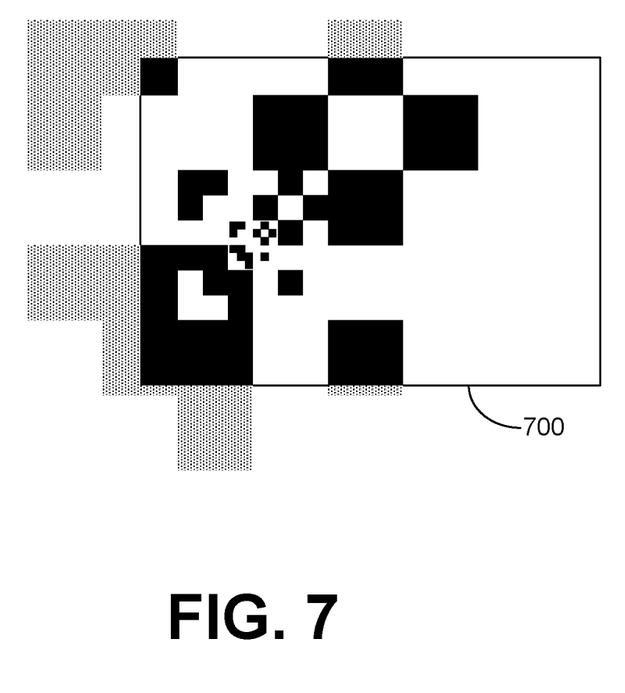
FIG. 7 illustrates one example of a multi-scale fiducial with a parent fiducial being clipped from an imaging device field of view according to various embodiments of the present disclosure.

Moving on to FIG. 7, shown is a multi-scale fiducial 100 as in FIG. 1, but with a specific field of view 700 illustrated for an imaging device 206 (FIG. 2). In this example, the imaging device 206 is too close to the multi-scale fiducial 100 and cannot see the entire parent fiducial 103 (FIG. 1) of the multi-scale fiducial 100. In other words, a portion of the parent fiducial 103 is clipped or not visible to the imaging device 206. This portion is visually depicted in FIG. 7 using a grayed pattern. The imaging device 206 can see portions of the parent fiducial 103, but perhaps not enough to properly recognize the parent fiducial 103.

Nonetheless, the imaging device 206 can see the entirety of the child fiducial 106 (FIG. 1) and the grandchild fiducial 109 (FIG. 1) as they are within the field of view 700. In this example, the child fiducial 106 and the grandchild fiducial 109 encode the same information, so there is no loss of information. The fiducial recognition logic 218 (FIG. 1) is thus able to recognize the child fiducial 106 and/or the grandchild fiducial 109 without recognizing the parent fiducial 103. In some scenarios, the fiducial recognition logic 218 may have already recognized the parent fiducial 103. The control logic 203 (FIG. 2) may have applied a certain action 227 (FIG. 2) causing the autonomously controlled aerial vehicle to move to its current position with the given field of view 700 to receive further instruction from the child fiducial 106 and/or the grandchild fiducial 109.

Figure 8:
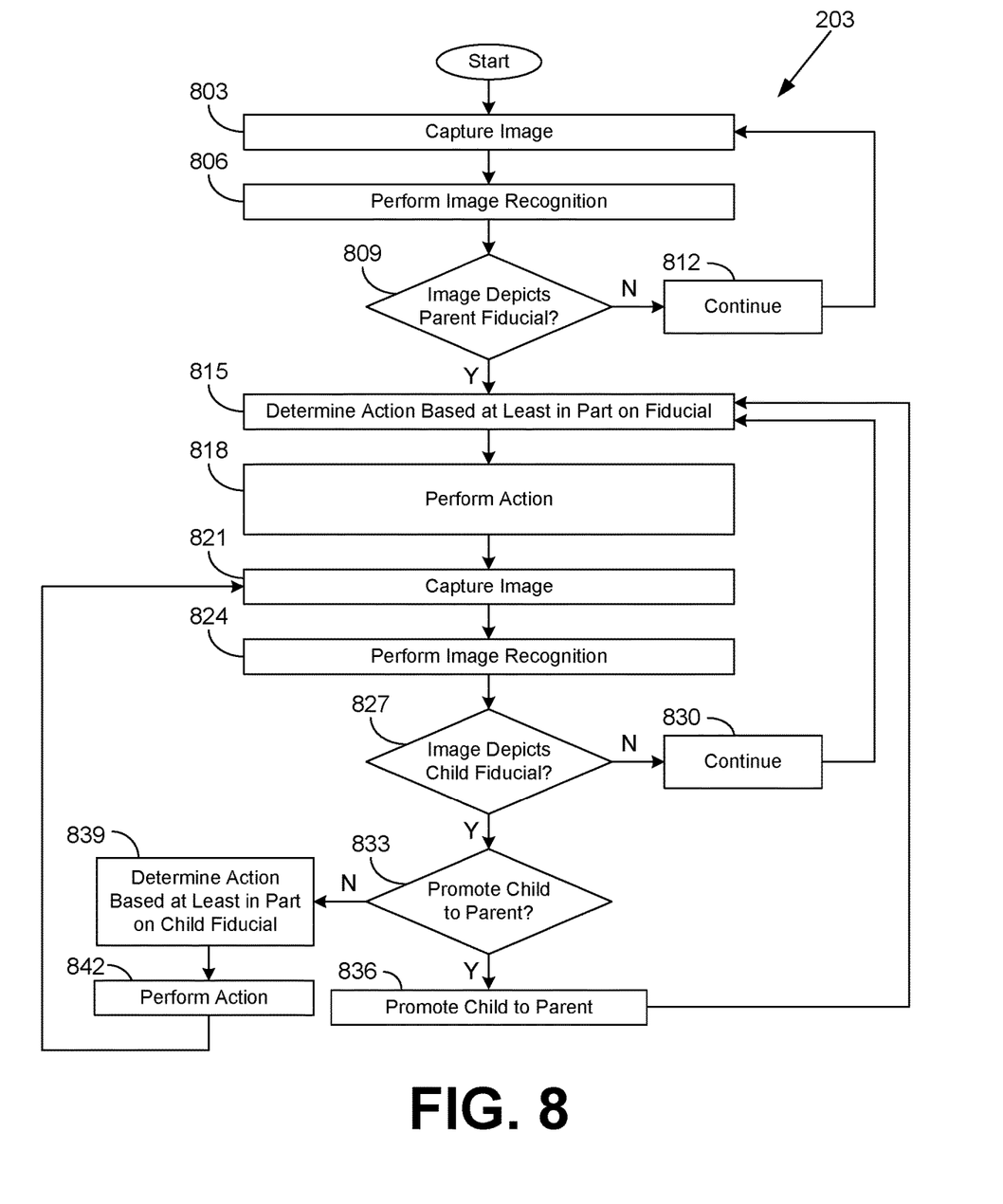
FIG. 8 is a flowchart illustrating one example of functionality implemented as portions of control logic executed in the autonomously controlled aerial vehicle of FIG. 2 according to various embodiments of the present disclosure.

Referring next to FIG. 8, shown is a flowchart that provides one example of the operation of a portion of the control logic 203 according to various embodiments. It is understood that the flowchart of FIG. 8 provides merely an example of the many different types of functional arrangements that may be employed to implement the operation of the portion of the control logic 203 as described herein. As an alternative, the flowchart of FIG. 8 may be viewed as depicting an example of elements of a method implemented in the autonomously controlled aerial vehicle 200 (FIG. 2) according to one or more embodiments.

Beginning with box 803, the control logic 203 captures an image via an imaging device 206 (FIG. 2). For example, the autonomously controlled aerial vehicle 200 may be piloted toward a predetermined location or object and continuously capture images to identify how it should land at the location or interact with the object. In box 806, the control logic 203 performs image recognition using the fiducial recognition logic 218 (FIG. 2). In box 809, the control logic 203 determines whether the image depicts a parent fiducial of a multi-scale fiducial according to the predefined fiducial patterns 224 (FIG. 2). If the control logic 203 determines that the image does not depict the parent fiducial, or if the result is inconclusive, the control logic 203 moves to box 812 and allows the autonomously controlled aerial vehicle to continue in its course. The control logic 203 then returns to box 803 and continues capturing images.

If the control logic 203 otherwise determines that the image does depict a parent fiducial, the control logic 203 instead moves from box 809 to box 815. In box 815, the control logic 203 determines an action 227 (FIG. 2) based at least in part on the fiducial pattern 224 that has been recognized. In box 818, the control logic 203 performs an action 227 that may, for example, result in the autonomously controlled aerial vehicle 200 moving closer to the recognized fiducial.

In box 821, the control logic 203 captures an image via an imaging device 206 from this closer distance from the recognized fiducial. In box 824, the control logic 203 performs image recognition using the fiducial recognition logic 218. In box 827, the control logic 203 determines whether the image depicts a child fiducial of the multi-scale fiducial. If a child fiducial is not recognized, the control logic 203 moves to box 830 and the autonomously controlled aerial vehicle 200 continues upon its course. The control logic 203 then may return to box 815.

Otherwise, if the control logic 203 recognizes the child fiducial, the control logic 203 transitions from box 827 to box 833. In box 833, the control logic determines whether to promote the child fiducial to be a parent fiducial. If so, the control logic 203 moves to box 836 and promotes the child to a parent. The control logic 203 then returns to box 815. If the child fiducial is not promoted to be a parent, the control logic 203 moves from box 833 to box 839.

In box 839, the control logic 203 determines an action 227 based at least in part on the child fiducial. In box 842, the control logic 203 causes the action 227 to be performed. Subsequently, the control logic 203 may return to box 821 and continue capturing images via the imaging device 206. Further child fiducials may then be recognized and additional actions 227 may be performed.

Although the flowchart of FIG. 8 depicts a flow pertaining to a movement from parent fiducials to child fiducials, it is understood that the reverse may also be performed. That is, a similar control flow may involve moving from a child fiducial to a parent fiducial and then a grandparent fiducial, and so on.

Figure 9:
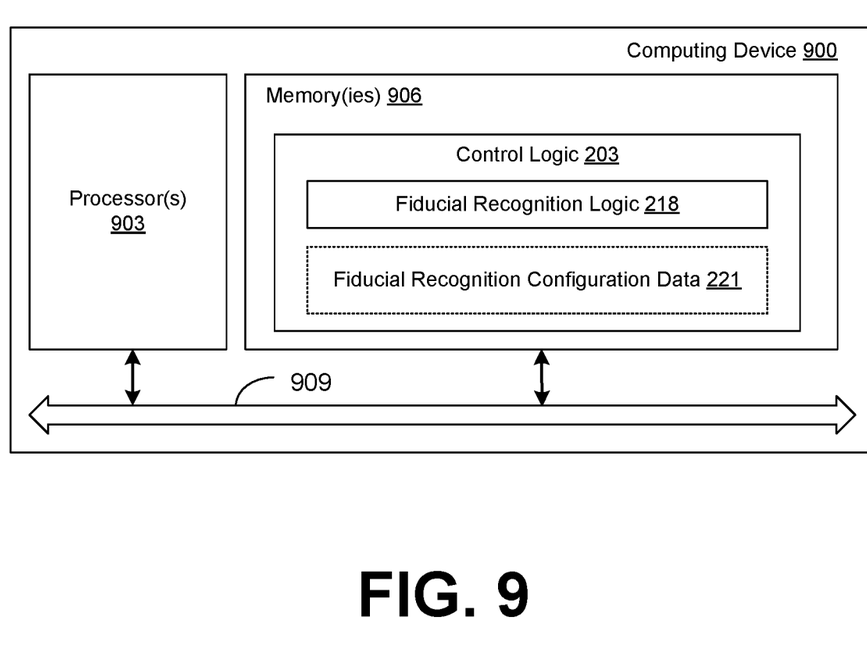
FIG. 9 is a schematic block diagram that provides one example illustration of a computing device according to various embodiments of the present disclosure.

With reference to FIG. 9, shown is a schematic block diagram of a computing device 900 according to an embodiment of the present disclosure. For example, the autonomously controlled aerial vehicle 200 may include a computing device 900. Alternatively, the computing device 900 may be embodied in other types of vehicles capable of movement, including land-based vehicles. In some embodiments, functionality of the control logic 203 may be performed by separate server or client computing devices 900 in data communication with the autonomously controlled aerial vehicle 200 or other vehicle via a network. Such computing devices 900 may be remotely located with respect to the autonomously controlled aerial vehicle 200 or other vehicle.

The computing device 900 includes at least one processor circuit, for example, having a processor 903 and a memory 906, both of which are coupled to a local interface 909. The local interface 909 may comprise, for example, a data bus with an accompanying address/control bus or other bus structure as can be appreciated.

Stored in the memory 906 are both data and several components that are executable by the processor 903. In particular, stored in the memory 906 and executable by the processor 903 is the control logic 203, including fiducial recognition logic 218 and potentially other systems. Also stored in the memory 906 may be the fiducial recognition configuration data 221 and other data. In addition, an operating system may be stored in the memory 906 and executable by the processor 903.

It is understood that there may be other applications that are stored in the memory 906 and are executable by the processor 903 as can be appreciated. Where any component discussed herein is implemented in the form of software, any one of a number of programming languages may be employed such as, for example, C, C++, C #, Objective C, Java®, JavaScript®, Perl, Visual Basic®, Python®, Flash®, assembly, or other programming languages.

A number of software components are stored in the memory 906 and are executable by the processor 903. In this respect, the term "executable" means a program file that is in a form that can ultimately be run by the processor 903. Examples of executable programs may be, for example, a compiled program that can be translated into machine code in a format that can be loaded into a random access portion of the memory 906 and run by the processor 903, source code that may be expressed in proper format such as byte code that is capable of being loaded into a random access portion of the memory 906 and executed by the processor 903, or source code that may be interpreted by another executable program to generate instructions in a random access portion of the memory 906 to be executed by the processor 903, etc. An executable program may be stored in any portion or component of the memory 906 including, for example, random access memory (RAM), read-only memory (ROM), hard drive, solid-state drive, USB flash drive, memory card, optical disc such as compact disc (CD) or digital versatile disc (DVD), floppy disk, magnetic tape, memory integrated in the processor 903, or other memory components.

The memory 906 is defined herein as including both volatile and nonvolatile memory and data storage components. Volatile components are those that do not retain data values upon loss of power. Nonvolatile components are those that retain data upon a loss of power. Thus, the memory 906 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), ferroelectric random access memory (FRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), flash memory, or other like memory device.

Also, the processor 903 may represent multiple processors 903 and/or multiple processor cores and the memory 906 may represent multiple memories 906 that operate in parallel processing circuits, respectively. In such a case, the local interface 909 may be an appropriate network that facilitates communication between any two of the multiple processors 903, between any processor 903 and any of the memories 906, or between any two of the memories 906, etc. The local interface 909 may comprise additional systems designed to coordinate this communication, including, for example, performing load balancing. The processor 903 may be of electrical or of some other available construction.

Although the control logic 203, the fiducial recognition logic 218, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), complex programmable logic devices (CPLDs), or other components, etc. Such technologies are generally well known by those skilled in the art and, consequently, are not described in detail herein.

The flowchart of FIG. 8 shows the functionality and operation of an implementation of portions of the control logic 203. If embodied in software, each block may represent a module, segment, or portion of code that comprises program instructions to implement the specified logical function(s). The program instructions may be embodied in the form of source code that comprises human-readable statements written in a programming language, assembly code, or machine code that comprises numerical instructions recognizable by a suitable execution system such as a processor 903 in a computer system or other system. The machine code may be converted from the source code, etc. If embodied in hardware, each block may represent a circuit or a number of interconnected circuits to implement the specified logical function(s).

Although the flowchart of FIG. 8 shows a specific order of execution, it is understood that the order of execution may differ from that which is depicted. For example, the order of execution of two or more blocks may be scrambled relative to the order shown. Also, two or more blocks shown in succession in FIG. 8 may be executed concurrently or with partial concurrence. Further, in some embodiments, one or more of the blocks shown in FIG. 8 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the control logic 203 and the fiducial recognition logic 218, that comprises software or code can be embodied in any non-transitory computer-readable medium for use by or in connection with an instruction execution system such as, for example, a processor 903 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the control logic 203 and the fiducial recognition logic 218, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 900 or in multiple computing devices 900. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, and at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
    an autonomously controlled aerial vehicle; and
    control logic implemented in the autonomously controlled aerial vehicle configured to perform a method comprising:
        capturing, via an imaging device of the autonomously controlled aerial vehicle, a first image at a first location;
        recognizing a first fiducial at a first scale of a multi-scale fiducial depicted within the first image, the first fiducial encoding data indicating a position of a second fiducial relative to the first fiducial;
        piloting the autonomously controlled aerial vehicle toward a first portion of the multi-scale fiducial based at least in part on the data indicating the position of the second fiducial relative to the first fiducial, the second fiducial being not nested within an outer boundary of the first fiducial;
        capturing, via the imaging device, a second image at a second location;
        recognizing the second fiducial at a second scale of the multi-scale fiducial, the second fiducial being depicted within the second image; and piloting the autonomously controlled aerial vehicle toward a second portion of the multi-scale fiducial in a different direction based at least in part on information contained in the second fiducial.

2. The system of claim 1, wherein the first fiducial and the second fiducial employ at least one of: different colors, textures, or patterns.

3. The system of claim 1, wherein recognizing the second fiducial further comprises recognizing the second fiducial using a scale-variant algorithm.

4. A system, comprising:
an autonomously controlled aerial vehicle; and
control logic implemented in the autonomously controlled aerial vehicle configured to perform a method comprising:
capturing, via an imaging device of the autonomously controlled aerial vehicle, a first image at a first location;
recognizing a first fiducial at a first scale of a multi-scale fiducial depicted within the first image;
piloting the autonomously controlled aerial vehicle toward a first portion of the multi-scale fiducial based at least in part on information contained within the first fiducial;
capturing, via the imaging device, a second image at a second location;
recognizing a second fiducial at a second scale of the multi-scale fiducial, the second fiducial being depicted within the second image; and
piloting the autonomously controlled aerial vehicle toward a second portion of the multi-scale fiducial in a different direction based at least in part on information contained in the second fiducial.

5. The system of claim 4, wherein each scale of the multi-scale fiducial is used independently to determine a relative position of a respective parent fiducial.

6. The system of claim 4, wherein each scale of the multi-scale fiducial is used independently to determine a relative position of a respective child fiducial.

7. The system of claim 4, wherein at least a portion of the first fiducial is clipped in the second image.

8. The system of claim 4, wherein the second fiducial is unresolvable from the first image by the control logic.

9. The system of claim 4, wherein recognizing the first fiducial further comprises actively ignoring data from the first image corresponding to an expected location of the second fiducial.

10. The system of claim 4, wherein the control logic is configured to recognize the first fiducial and the second fiducial without using a scale-invariant algorithm.

11. The system of claim 4, wherein the multi-scale fiducial is affixed to an object that has moved between when the first image was captured and when the second image was captured.

12. A method, comprising:
capturing, via an imaging device of an autonomously controlled aerial vehicle, a first image at a first location;
recognizing, via control logic of the autonomously controlled aerial vehicle, a first fiducial at a first scale of a multi-scale fiducial depicted within the first image;
piloting the autonomously controlled aerial vehicle toward a first portion of the multi-scale fiducial based at least in part on information contained within the first fiducial;
capturing, via the imaging device, a second image at a second location;
recognizing, via the control logic, a second fiducial at a second scale of the multi-scale fiducial, the second fiducial being depicted within the second image; and
piloting, via the control logic, the autonomously controlled aerial vehicle toward a second portion of the multi-scale fiducial in a different direction based at least in part on information contained in the second fiducial.

13. The method of claim 12, wherein each scale of the multi-scale fiducial is used independently to determine a relative position of a respective parent fiducial or a respective child fiducial.

14. The method of claim 12, wherein at least a portion of the first fiducial is clipped in the second image.

15. The method of claim 12, wherein the second fiducial is unresolvable from the first image by the control logic.

16. The method of claim 12, wherein the control logic is configured to recognize the first fiducial and the second fiducial without using a scale-invariant algorithm.

17. The method of claim 12, wherein the action comprises piloting the autonomously controlled aerial vehicle relative to multi-scale fiducial based at least in part on the information contained in the second fiducial.

18. The method of claim 12, wherein the multi-scale fiducial is affixed to an object that has moved between when the first image was captured and when the second image was captured.

19. The method of claim 12, wherein the second fiducial is not nested within an outer boundary of the first fiducial.

20. A method, comprising:
capturing, via an imaging device of an autonomously controlled aerial vehicle, a first image at a first location;
recognizing, via control logic of the autonomously controlled aerial vehicle, a first fiducial at a first scale of a multi-scale fiducial depicted within the first image, wherein recognizing the first fiducial further comprises actively ignoring data from the first image corresponding to an expected location of a second fiducial;
piloting the autonomously controlled aerial vehicle relative to the multi-scale fiducial based at least in part on information contained within the first fiducial;
capturing, via the imaging device, a second image at a second location;
recognizing, via the control logic, the second fiducial at a second scale of the multi-scale fiducial, the second fiducial being depicted within the second image; and
performing, via the control logic, an action based at least in part on information contained in the second fiducial.

\* \* \* \* \*